United States Patent
Guo et al.

(10) Patent No.: US 7,017,878 B2
(45) Date of Patent: Mar. 28, 2006

(54) BOOK HOLDER ON THE STEERING WHEEL

(76) Inventors: James Guo, 171 Orsi Cir., San Franciso, CA (US) 94124; Wendy Zang, 171 Orsi Cir., San Francisco, CA (US) 94124

( * ) Notice: Subject to any disclaimer, the term of this patent is extended or adjusted under 35 U.S.C. 154(b) by 0 days.

(21) Appl. No.: 10/650,248

(22) Filed: Aug. 28, 2003

(65) Prior Publication Data

US 2004/0094677 A1  May 20, 2004

Related U.S. Application Data

(60) Provisional application No. 60/407,152, filed on Aug. 30, 2002.

(51) Int. Cl.
*A47F 5/00* (2006.01)

(52) U.S. Cl. .................. 248/309.1; 248/459; 248/447; 248/460; 108/44; 108/42; 281/49; 224/276

(58) Field of Classification Search ................ 248/447, 248/309.1, 459, 460, 451, 449, 444, 442.2, 248/441.1; 108/44, 42; 281/49, 48; 224/276
See application file for complete search history.

(56) References Cited

U.S. PATENT DOCUMENTS

| | | | |
|---|---|---|---|
| 541,834 A * | 7/1895 | Buckland ..................... 248/453 |
| 2,301,692 A * | 11/1942 | Forca .......................... 248/452 |
| 2,374,409 A * | 4/1945 | Brennan ...................... 248/453 |
| 3,281,109 A * | 10/1966 | Levandowski ........... 248/447.1 |
| 3,460,795 A * | 8/1969 | Dahlin ........................ 248/452 |
| 3,643,606 A * | 2/1972 | Vise .............................. 108/44 |
| 3,747,889 A * | 7/1973 | Gerald ........................ 248/451 |
| 4,139,217 A | 2/1979 | Jamison |
| 4,375,881 A | 3/1983 | Mitchell |
| 4,726,607 A * | 2/1988 | White .......................... 281/45 |
| 4,890,559 A * | 1/1990 | Martin ......................... 108/44 |
| 4,969,623 A * | 11/1990 | Bernier ..................... 248/441.1 |
| 4,995,637 A * | 2/1991 | Muraishi ..................... 280/727 |
| 5,060,581 A * | 10/1991 | Malinski ....................... 108/44 |
| 5,193,777 A | 3/1993 | Faulstich |
| 5,385,283 A * | 1/1995 | Shioda ....................... 224/276 |
| D358,612 S * | 5/1995 | Smith .......................... D19/88 |
| 5,413,035 A * | 5/1995 | Fernandez ................... 100/44 |
| 5,487,521 A | 1/1996 | Callahan |
| 5,558,026 A * | 9/1996 | Seibert ......................... 108/44 |
| 5,642,674 A * | 7/1997 | Joye et al. .................... 108/43 |
| 5,749,305 A | 5/1998 | Jacovelli |
| 5,845,585 A * | 12/1998 | Meeus et al. ................. 108/44 |
| D409,962 S * | 5/1999 | Demont .................... D12/177 |
| 6,019,339 A | 2/2000 | Brayford |
| 6,045,159 A | 4/2000 | Bellah |
| 6,109,658 A | 8/2000 | Moore |
| 6,412,425 B1 | 7/2002 | Chen |

FOREIGN PATENT DOCUMENTS

| | | | |
|---|---|---|---|
| CA | 2083567 | * | 5/1994 |
| DE | 10025765 A1 | * | 5/2002 |
| GB | 2338893 A | * | 1/2000 |
| JP | 404095536 A | * | 3/1992 |

* cited by examiner

*Primary Examiner*—Kimberly T. Wood

(57) ABSTRACT

A book holder for use with automobile steering wheel is not only fastened to the rim of an automobile or truck steering wheels so as to hold printed matter and various electronic devices, but also is foldable to smaller size for storage. The book holder can also be used as a desk to read and write on it and can be installed or removed from the steering wheel within seconds. This book holder includes two built-in elastic bands to prevent unexpected book turning pages and two elastic loops for holding the pens.

1 Claim, 2 Drawing Sheets

BOOK HOLDER ON THE STEERING WHEEL

CROSS-REFERENCE TO RELATED APPLICATION

This application is entitled to the benefit of Provisional Patent Application Ser. No. 60/407,152 filed 2002 Aug. 30.

FEDERAL SPONSORED RESEARCH

Not Applicable

SEQUENCE LISTING OR PROGRAM

Not Applicable

BACKGROUND OF THE INVENTION—FIELD OF THE INVENTION

This invention relates to an inside-vehicle book or magazine holding device on the steering wheel, specifically to such device which is used for holding the reading materials, tablet PC, PDA, mini TV, portable DVD player or writing on the support device inside the vehicle so they can be readily viewed by the user on the driver seat when the vehicle is in parking status. This device will hereafter be referred to simply as the book holding device on the steering wheel.

BACKGROUND OF THE INVENTION—DESCRIPTION OF PRIOR ART

Many people drive a vehicle to pick up the passengers, or attend a meeting and event. Sometimes, they need to wait in the parking lot or parking space if they are ahead of schedule or waiting for the passengers to come. Reading books, magazines, watching mini TV, portable DVD, working on the PDA, tablet PC or writing might be one of the things they would like to do while they are waiting inside the vehicle.

Book holders or book holding device are known in a variety of designs—for example, in U.S. Pat. Nos. 6,019,339 (2000), 6,045,159 (1998) and 6,109,658 (1999). However, there are very few book holding devices currently available to use inside of the vehicle for the person at the driver seat, i.e. book holding device on the steering wheel. U.S. Pat. No. 5,193,777 (1993) is a note-map holder on the steering wheel which has a plastic means for holding a map. But it does not have the structure to hold a book or mini electronic devices.

U.S. Pat. Nos. 4,139,217 (1979), 5,487,521 (1996) and 5,749,305 (1998) disclose a vehicular desk/tray on the steering wheel to provide a planar writing surface and support desk for portable computer, printed matter, food and/or beverage. Such desks/trays are heavy and not easy to store when not in use.

U.S. Pat. No. 4,375,881 (1983) discloses a portable thin desk to use as a writing surface. It could not be installed as easy as the book holder in the present invention.

U.S. Pat. No. 6,412,425 (2002) discloses a horizontally foldable steering wheel table. This device is bulky due to the cup slot has to be larger than the upper rim of the steering wheel. It is not a simple device which can be manufactured with low cost.

It is desirable to produce an uncomplicated book holding device for holding printed matters, mini TV, portable DVD, tablet PC, PDA in the vehicle for the person at the driver seat which does not require the reader to operate intricately in using the book holding device.

BACKGROUND OF INVENTION—OBJECTS AND ADVANTAGES

A primary object of the present invention is to provide a book holder on the steering wheel for the user at the driver seat to read book, magazine while the vehicle is in parking status.

Accordingly, besides the objects and advantages of providing a book holder on the steering wheel in the present patent, several objects and advantages of the patent invention are:

(a) to provide a simple device for the reader at the driver seat inside of a vehicle to view reading material without changing the viewer's position;

(b) to provide a hinge and foldable shelf on the device, so it can be folded into small object and easily stored between or under the car seats when not in use;

(c) to provide a lightweight device produced using plastic, cardboard and 600 denier polyester;

(d) to provide a comfortable place for the person to write at the driver seat;

(e) to provide the built-in elastic band applied to prevent unexpected book turning pages.

(f) to provide a steering wheel desk which can be installed or removed from the steering wheel within seconds.

(g) to provide a device which is designed to fit most standard vehicle steering wheels.

(h) to provide the built-in elastic loops to hold the pens.

Further objects and advantages are to provide a book holding device which can be used easily and conveniently to manipulate inside of a vehicle at the driver side, which is simple and inexpensive to manufacture. It is also an important objective of the present invention to provide a book holding device that can be easily packaging and shipping.

SUMMARY OF THE INVENTION

The book holder on the steering wheel of the present invention provides the simple device for the person to read the book and magazine at the driver seat. Specifically, the present invention discloses an easy to operate book holder for users at the driver seat. The benefits of the book holder are immediately apparent to anyone who has tried to read the books, magazines, write on memo or watch portable DVD player or even use tablet PC when he/she sits in the vehicle.

DRAWINGS—FIGURES

DRAWINGS—REFERENCE NUMERALS

Figure 1:
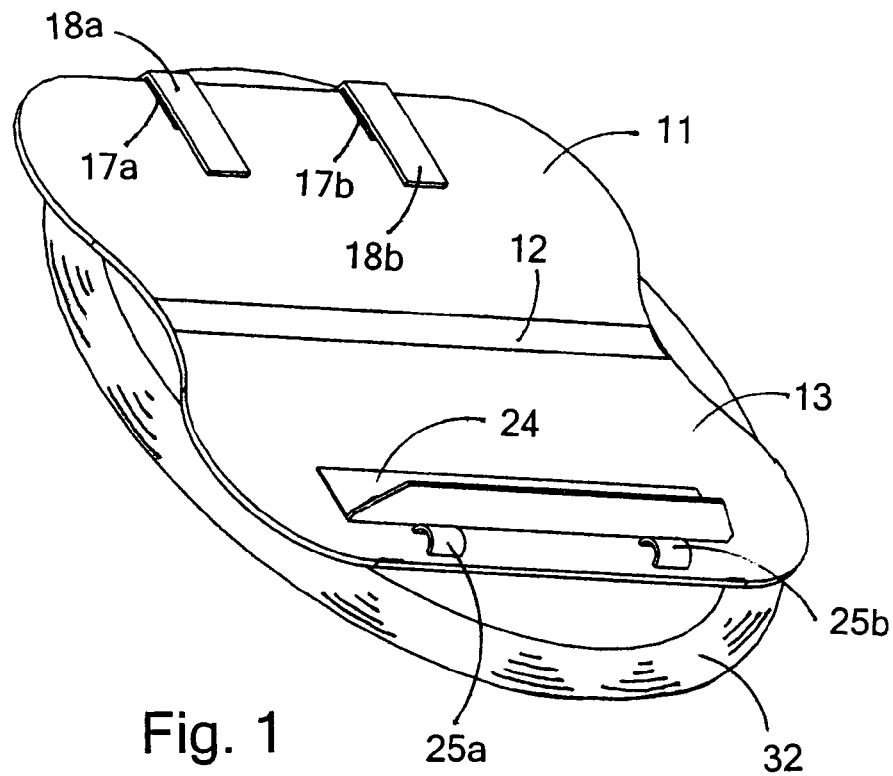
FIG. 1 is a perspective view of the embodiment showing two support plates resting on top of a steering wheel using two fastening straps hanging on the top portion of the steering wheel.

11 Upper filleted rectangle support plate
12 Hinge
13 Lower filleted rectangle support plate
17 Mating pad of the hook-and-loop fasteners
18 The hook-and-loop fastening pad straps
24 Foldable shelf
25 Elastic loops 26 Elastic bands
32 Steering wheel

DETAILED DESCRIPTION

FIG. 1 perspectively shows a preferred embodiment made of lightweight, rigid, good strength, low stretch materials such as rigid type of plastic, cardboard and 600 denier polyester, wherein 11 is a upper filleted rectangle support plate, 12 is a hinge, 13 is a lower filleted rectangle support plate, 17a and 17b are the mating pads of the hook-and-loop fastener permanently attached on the upper filleted rectangle support plate, 18a and 18b are the fastening straps. 24 is a built-in foldable shelf which is mounted on the lower filleted rectangle support plate. 25a and 25b are elastic loops for holding pens or pencils. 26a and 26b are elastic bands which are mounted on the rear side of lower filleted rectangle support plate to prevent the unexpected book turning pages.

Said upper filleted rectangle support plate 11, hinge 12, and lower filleted rectangle support plate 13 are made of the lightweight, rigid material such as rigid type of the plastic, cardboard and 600 denier polyester.

Said pad straps 18a, 18b and mating pads 17a and 17b are the pads and mating pads of the hook-and-loop fastener. The length of the straps is long enough to fit most standard vehicle steering wheels.

Figure 2:
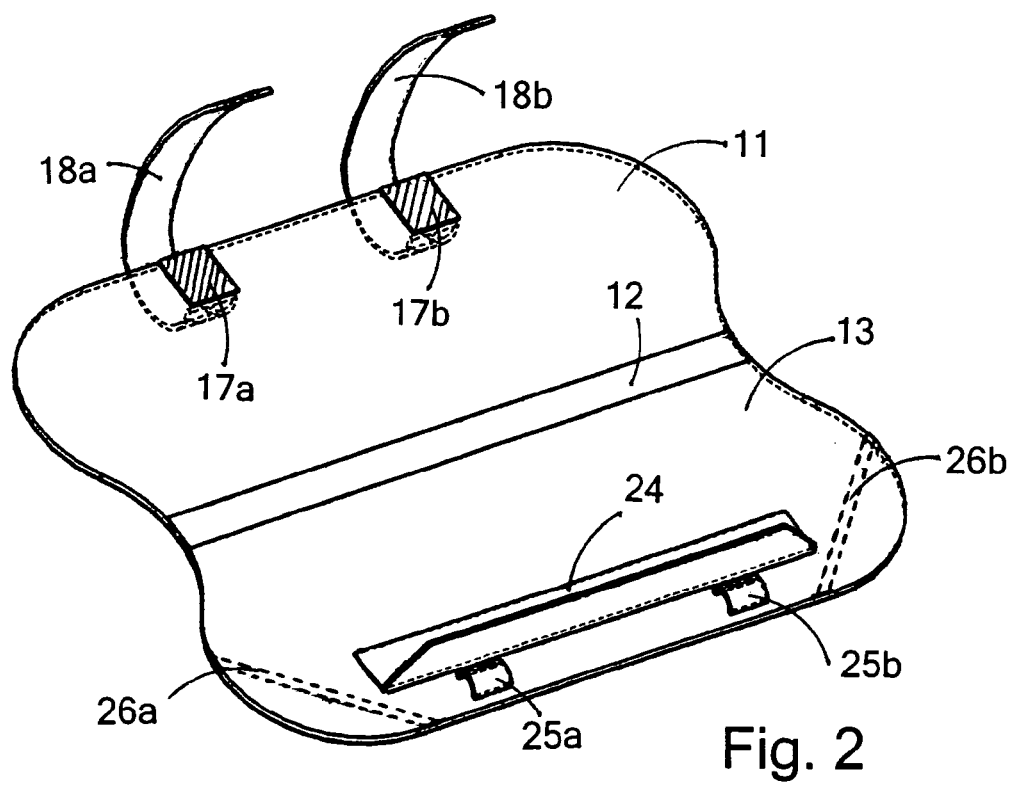
FIG. 2 is a perspective view of the embodiment showing all the components of the invention.

FIG. 2 depicts the invention book holder on the steering wheel in it's functional form, beginning with two free ends of the straps 18a and 18b inserting through the top rim of the steering wheel 32 anti-clockwise and hanging on the top rim of the steering wheel 32 using the hook-and-loop fasteners. The two support plates are rest on the top of the steering wheel to provide a flat plate to place the printed matters or electronic devices on top of it.

Figure 3:
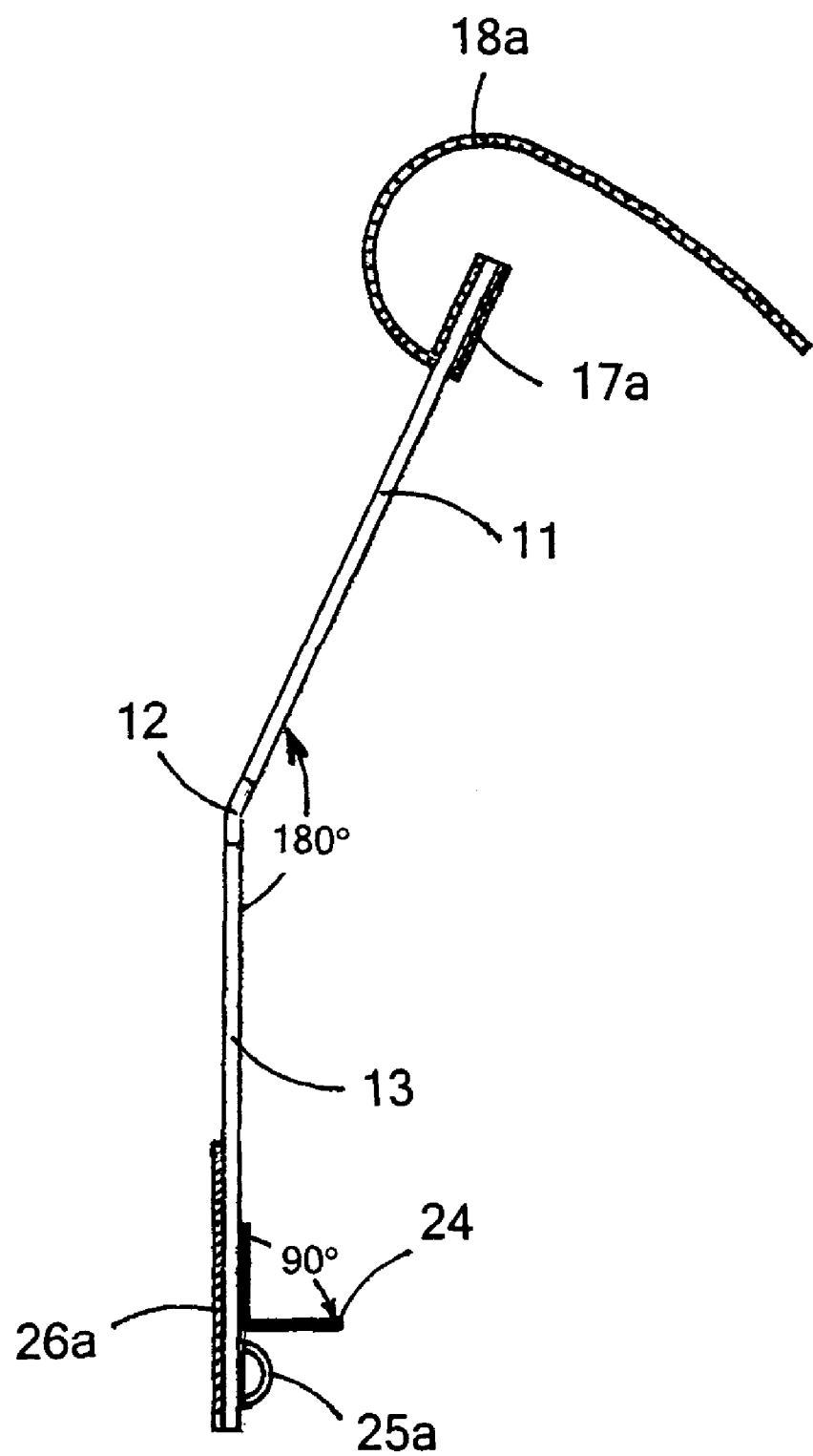
FIG. 3 is a left side view of the embodiment showing the device could be folded into smaller size and the shelf could be folded too.

FIG. 3 is a side view showing the embodiment of this invention could be folded into a smaller size and the shelf could be folded too.

DETAILED DESCRIPTION—OPERATION

The operation of the book holder on the steering wheel according to this invention will be evident. To use this invention inside of the vehicle, the user unfolds the support plates 11 and 13 and unfold the foldable shelf 24 from the device package. The free ends of the straps 18a and 18b are inserted through the top rim of the steering wheel 32 anti-clockwise. The said free ends of the straps are fastened using the hook-and-loop fasteners 18a, 18b, 17a, 17b. The two supporting plates 11, 13 and foldable shelf 24 provide a support platform to place printed matter or electronic devices on it.

What is claimed is:

1. A book holding device adapted for use with a vehicle steering wheel comprising:
    an upper filleted rectangular support plate having an upper surface, a lower surface, an upper edge, and a lower edge;
    an lower filleted rectangular support plate having an upper surface, a lower surface an upper edge, and a lower edge;
    a hinge for connecting said upper support plate lower edge to the lower support plate upper edge; wherein the support plates are pivotable from an open position to a closed position;
    two identical mating pads formed of hook-and-loop fastener material attached adjacent to the upper support plate upper edge,
    two identical fastening straps attached to said upper support plate lower surface and being formed of a material to connect with the two identical mating pads,
    the two fastening straps configured to loop around a steering wheel and connect the upper support plate to the steering wheel;
    A folding shelf being attached to the lower support plate;
    two identical elastic loops located below the folding shelf adapted to hold a writing utensil;
    two identical elastic bands attached to a lower surface of the lower support plate and each connect diagonally across the corners of the lower support plate, the elastic bands configured to attach the lower support plate to the steering wheel.

* * * * *

UNITED STATES PATENT AND TRADEMARK OFFICE
CERTIFICATE OF CORRECTION

PATENT NO. : 7,017,878 B2
APPLICATION NO. : 10/650248
DATED : March 28, 2006
INVENTOR(S) : James Guo and Wendy Zang It is certified that error appears in the above-identified patent and that said Letters Patent is hereby corrected as shown below:

Column 4,
Line 33, after "to the lower support plate" insert -- to form a support platform to hold printed matter or electronic devices --.
Line 39, delete from "attach the lower" to and including "the steering wheel." and insert -- the elastic bands configured to prevent book pages from turning. --.

Signed and Sealed this

Twenty-seventh Day of June, 2006

JON W. DUDAS
*Director of the United States Patent and Trademark Office*